(12) United States Patent  
Rotbart et al.

(10) Patent No.: US 8,107,606 B2  
(45) Date of Patent: Jan. 31, 2012

(54) METHOD FOR INITIATING A CONNECTION BETWEEN COMMUNICATION DEVICES OF AT LEAST TWO PARTIES

(75) Inventors: Assi Rotbart, Tel aviv (IL); Yigal Jack, Tel Aviv (IL)

(73) Assignee: NTTM Limited, Nicosia (CY)

( * ) Notice: Subject to any disclaimer, the term of this patent is extended or adjusted under 35 U.S.C. 154(b) by 0 days.

(21) Appl. No.: 12/668,529

(22) PCT Filed: Jul. 8, 2008

(86) PCT No.: PCT/IL2008/000932  
§ 371 (c)(1),  
(2), (4) Date: Jan. 11, 2010

(87) PCT Pub. No.: WO2009/007956  
PCT Pub. Date: Jan. 15, 2009

(65) Prior Publication Data  
US 2010/0144335 A1 Jun. 10, 2010

Related U.S. Application Data

(60) Provisional application No. 60/948,533, filed on Jul. 9, 2007.

(51) Int. Cl.  
*H04M 3/42* (2006.01)  
*H04M 1/26* (2006.01)  
*H04M 1/27* (2006.01)  
*H04M 3/44* (2006.01)  
*H04B 1/38* (2006.01)  
*H04W 4/00* (2009.01)

(52) U.S. Cl. ......... 379/201.01; 379/216.01; 379/355.04; 379/357.01; 455/414.1; 455/466; 455/558; 455/564

(58) Field of Classification Search ............. 379/201.01, 379/216.01, 220.01, 355.01, 355.02, 355.03, 379/355.04, 357.01, 357.02; 455/418, 466, 455/558, 559, 414.1, 564  
See application file for complete search history.

(56) References Cited

U.S. PATENT DOCUMENTS 5,337,347 A 8/1994 Halstead-Nussloch et al.  
5,457,738 A 10/1995 Sylvan  
(Continued)

OTHER PUBLICATIONS

"Telephone number mapping;" *Wikipedia, the free encyclopedia*; edited Apr. 9, 2007; obtained Dec. 4, 2010; http://en.Wikipedia.org/w/index.php?title=Telephone_ number_mapping&oldid=12149.

(Continued)

*Primary Examiner* — Harry Hong  
(74) *Attorney, Agent, or Firm* — Oliff & Berridge, PLC

(57) ABSTRACT

A method and system for initiating a connection between at least a first communication device and a second communication device respective of a first party and a second party. According to the present invention initiating a connection includes obtaining a destination subscriber identifier from the first party, wherein the destination subscriber identifier is a string including at least one character different than a numeric character and is respective of the second party. Then, a resolution request that includes data indicative of the destination subscriber identifier is conveyed to a hosting information storage server respective of the destination subscriber identifier, a resolution response including a destination address respective of the second communication device wherein the second party is available is obtained, and then, the present invention includes initiating a connection between the first communication device and the second communication device.

84 Claims, 14 Drawing Sheets

U.S. PATENT DOCUMENTS

| | | | |
|---|---|---|---|
| 5,966,652 | A | 10/1999 | Coad et al. |
| 6,317,489 | B1 | 11/2001 | Parsadayan |
| 6,947,770 | B2 | 9/2005 | Rydbeck |
| 6,950,988 | B1 | 9/2005 | Hawkins et al. |
| 6,963,638 | B1 | 11/2005 | Keller |
| 7,020,261 | B2 | 3/2006 | McGrath et al. |
| 7,027,582 | B2 | 4/2006 | Khello et al. |
| 7,065,385 | B2 | 6/2006 | Jarrad et al. |
| 7,171,228 | B2 | 1/2007 | Florkey et al. |
| 2004/0018852 | A1 | 1/2004 | Burke et al. |
| 2006/0015819 | A1 | 1/2006 | Hawkins et al. |
| 2007/0280233 | A1 | 12/2007 | Bush |
| 2008/0045247 | A1* | 2/2008 | Wilson ............... 455/466 |
| 2009/0017794 | A1* | 1/2009 | Wilson ............... 455/414.1 |
| 2010/0008491 | A1* | 1/2010 | Nahum ............... 379/216.01 |

OTHER PUBLICATIONS

Neustar; "Welcome to ENUM.ORG;" 1999-2000; obtained Dec. 4, 2010; http://www.enum.org.

"E.164;" *Wikipedia, the free encyclopedia*; edited Mar. 26, 2007; obtained Dec. 4, 2010; http://en.Wikipedia.org/w/index.php?title=E.164&oldid=117953889.

Neustar; "Intelligent routing of IP traffic between networks is possible;" IP Exchange Services; 2010; obtained Dec. 4, 2010; http://www.neustar.biz/services/ip-exchange-services.

Rosenberg et al.; "SIP: Session Initiation Protocol;" *Standards Track*; Jun. 2002; pp. 1-236; The Internet Society; http://www.ietf.org/rfc/rfc3261.txt.

Schulzrinne; "The tel URI for Telephone Numbers;" *Standards Track*; Dec. 2004; pp. 1-18; The Internet Society; http://tools.ietf.org/html/rfc3966.

Faltstrom; "E.164 number and DNS;" *Standards Track*; Sep. 2000; pp. 1-9; The Internet Society; http://www.ietf.org/rfc/rfc2916.txt.

"Unstructured Supplementary Services Data;" *Mobile in a Minute*™; 2001-2004; obtained Apr. 14, 2010; http://www.mobilein.com/ussd.htm.

"Digital cellular telecommunications system (Phase 2+); Unstructured Supplementary Service Data (USSD)-Stage 1 (GSM 02.90 version 8.0.0 Release 1999);" *Global System for Mobile Communications*; 1999; pp. 1-11; European Telecommunications Standards Institute.

"Wireless Application Protocol, Wireless Telephony Application Interface Specification;" *Wireless Application Protocol Forum Ltd.*; 2000; pp. 1-54.

Written Opinion of the International Searching Authority mailed on Nov. 10, 2008 in corresponding International Application No. PCT/IL2008/000932.

International Search Report mailed on Nov. 10, 2008 in corresponding International Application No. PCT/IL2008/000932.

\* cited by examiner

Subscriber Identification [ALMONI] *

Home Phone: [11111]

Business Phone: [ ]

Mobile Phone: [22222]

Custom Phone: [ ]

Fields marked with * are mandatory

— 801

Subscriber Identification [ALMONI] *

Home Phone: [ ]

Business Phone: [ ]

Mobile Phone: [ ]

Custom Phone: [HOTEL 33333]

Fields marked with * are mandatory

— 802

Subscriber Identification [ALMONI] *

Home Phone: [ ]

Business Phone: [ ]

Mobile Phone: [ ]

Custom Phone: [<DEL>]

Fields marked with * are mandatory

| Subscriber Identification | ALMONI | * |

Home Phone: 11111

Business Phone: 55555

Mobile Phone: 44444

Custom Phone: HOTEL 33333

Fields marked with * are mandatory

— 804

| Subscriber Identification | ALMONI | * |

Home Phone: 11111

Business Phone: 55555

Mobile Phone: 44444

Custom Phone:

Fields marked with * are mandatory

GET /resolve?name=ENCODED_DATA HTTP/1.0

Figure 13

HTTP/1.1 200 OK
Date: Mon, 23 May 2005 22:38:34 GMT
Server: Apache/1.3.3.7 (Unix) (Red-Hat/Linux)
Last-Modified: Wed, 08 Jan 2003 23:11:55 GMT
Accept-Ranges: bytes
Content-Length: xx
Connection: close
X-User-Status: 0
Content-Type: text/xml; charset=UTF-8

<?xml version="1.0"?>
    <status>0</status>
    <name>ENCODED_NAME</name>
    <domain>ENCODED_DOMAIN</domain>
    <number>NUMBER</number>
    <email>EMAIL</email>
    <address>ADDRESS</address>
</xml>

Figure 14

METHOD FOR INITIATING A CONNECTION BETWEEN COMMUNICATION DEVICES OF AT LEAST TWO PARTIES

FIELD OF THE INVENTION

This invention relates to initiating a connection.

BACKGROUND OF THE INVENTION

In the past, when dialing from a communication device, only numerals could have been dialed.

See, for example, RFC 3966 (a Network Working Group's Request For Comments, "The tel URI for Telephone Numbers", 2004), defining the URI (Uniform Resource Identifier) scheme "tel", which describes resources identified by telephone numbers. According to the RFC a telephone number is a string of decimal digits that uniquely indicates the network termination point. The number contains the information necessary to route the call to this point. The termination point of the "tel" URI telephone number is not restricted. It can be in the public telephone network, a private telephone network, or the Internet. It can be fixed or wireless and address a fixed wired, mobile, or nomadic terminal. The terminal addressed can support any electronic communication service (ECS), including voice, data, and fax. The URI can refer to resources identified by a telephone number, including but not limited to originators or targets of a telephone call.

Methods and systems have since been developed, allowing conversion of alphanumeric characters into numeric characters for dialing.

For example, US2004018852 ("Method and Apparatus for Alphanumeric Address Book Conversions in a Wireless Communication Apparatus", published 2004) discloses a system and method for allowing a wireless communication device for conveniently converting alphanumeric characters into numeric characters for dialing. The device may further include a Personal Digital Assistant (PDA) as part of the wireless communication device. The unit accepts input from memory that has been highlighted on the PDA display. Any alphanumeric characters saved in address book phone entries will be automatically converted to phone numeric equivalents when dialed. For example, a stored number of 1-800-2EU-DORA is treated as 18002383672 when dialed. The unit accepts input from memory into an Alphanumeric to Numeric Converter where the letters and non integers are converted into numbers to be dialed. The converted number is then passed through an undefined character filter where undefined characters are eliminated. The output is then sent to a display where an optional confirmation step takes place before the wireless communication device dials the intended number.

U.S. Pat. No. 7,065,385 ("Apparatus, Methods, and Computer Program Products for Dialing Telephone Numbers Using Alphabetic Selections", published 2006) describes a method for dialing a telephone number from a communication device that includes an alphanumeric input device. The alphanumeric input device allows selection of a plurality of alphabetic characters and selection of a plurality of numeric characters. An alphabetic character that is selected among the plurality of alphabetic characters is sensed. The sensed alphabetic character is translated into a number. A numeric character, that is selected separately from the selection of the alphabetic character, is sensed, A telephone number that includes the translated number and the sensed numeric character is dialed.

Mobile telephones, such as cellular telephones, and sometimes also other telephones may have an address book (also known as "telephone book" or "phone book"). However, these address books are limited in that they contain a certain number of telephone numbers, and in order to use them for dialing a number that is not included therein the user has to enter the number into the address book beforehand.

In addition, users sometimes store personal information data in Personal Information Management (PIM) applications, e.g., in Personal Digital Assistants (PDAs). US 2006/0015819 ("Integrated handheld computing and telephony system and services", published January 2006), for example, discloses an integrated handheld computer and telephony system. Integration of the handheld computer and telephony system is at the physical and operational level. For example, the integrated handheld computer and telephony system physically integrates a handheld computer with a mobile (e.g., cellular) telephone. In addition, the handheld computer is distinct from a telephony system in that they are logically separable. However, they are also operationally integrated. For example, the telephony system executes a telephone application on the processor of the handheld computer. Likewise, the handheld computer can execute applications, for example, a phone book, that can be used to launch the telephony application.

In U.S. Pat. No. 5,337,347 ("Method and System for Progressive Database Search Termination and Dynamic Information Presentation Utilizing Telephone", published 1994) a method and system are disclosed for searching a remote database utilizing a telephone device in communication with a data processing system. The data processing system has access to the remote database and the telephone device includes transmitter components for transmitting dual-tone multifrequency signals, wherein the dual-tone multifrequency signals are generated manipulating a keypad associated with the telephone device. The keypad has individually depressible alpha-numeric keys that may be utilized to generate a query and to send commands to the data processing system. The method of U.S. Pat. No. 5,337,347 includes prompting the user to enter a query utilizing the depressible alpha-numeric keys on the keypad. As the query is input from the user, the data processing system searches the database to locate entries within the database corresponding to current state of the query. As the user enters additional data to modify the query, the database is searched for entries corresponding to each modification of the query entered by the user. The user might or might not be prompted for each modification of the query. These steps of modifying the query and performing a search based on the modified query are repeated until the entries found are less than some predetermined number. At any time, an early termination command generated by the user may be utilized to immediately terminate the steps. In response to the number of entries being less than the predetermined number or receiving the early termination command, the entries may be presented to the user via the telephone device.

U.S. Pat. No. 6,317,489 ("Entry phone apparatus and method with improved alphabetical access", published 2001) discloses an access control apparatus that has a visual display, a plurality of input keys, and an encoder, all of which are operably connected to a communication device. The communication device includes a memory and an electronic directory of names and associated codes. The electronic directory may be configured as a sequential data structure. An encoder is associated with an alphabetical index and can be set to refer to a particular portion of the alphabet. Alternatively, a portion of the visual display itself can be utilized to show the alphabet, using slew switches to allow movement within the alphabet. On the visual display, the communication device displays one or more entries from the electronic directory corresponding to the portion of the alphabet selected on the encoder or on the alphabet portion of the display. The apparatus may also include a scrolling device that enables a user to scroll through the electronic directory, beginning at the name or names that are displayed on the display.

There are available on-line public commercial directories, such as The Yellow Pages. Such directories store information in a database. U.S. Pat. No. 5,457,738 ("Method and System for Searching an On-line Directory at a Telephone Station", published 1995), for example, discloses a method and system for processing and displaying objects to permit a search of a database by a user of a telephone station. The telephone station includes a computer and a display device having a display screen adapted to cooperate with a pointing device. The method of U.S. Pat. No. 5,457,738 includes providing a database and a first index list, and displaying an array of objects on the display screen. It also includes receiving a first set of signals relating to at least one object from the displayed array of objects; creating a first search string based on the first set of signals; displaying a plurality of entries of the first index list based on the value of the first search string; and receiving a signal relating to one of the displayed entries, the signal identifying an entry selected by the user. The method of U.S. Pat. No. 5,457,738 finally includes the step of displaying at least one object representing a phone number associated with the selected entry.

In addition, there are publications teaching how a user can dial other users without looking for or storing their numbers beforehand. For example, U.S. Pat. No. 6,963,638 ("Method for using alphanumerical signs as a call number", published 1991) describes a method for using alphanumeric characters for a call number to establish a phone connection and for internal signaling in and between telecommunication networks. U.S. Pat. No. 6,963,638 describes also an alternative additional dialing method on an alphanumeric basis by using the complete character set of the ASCII character set with its national embodiments (alphanumeric subscriber call number ATR) with any length of the ATR freely set by the subscriber as an optional alternative that coexists with the current dialing method with a decimal number system (NTR). The ATR is sent from the terminal to the switching center and used preferably to establish a connection or converted to an NTR that is used to establish the connection with the target subscriber. According to U.S. Pat. No. 6,963,638, the method may be introduced as an overlay process for the existing dialing method within existing networks.

Yet, there is a need in the art for a method and system that allows a user dialing other users without storing their numbers beforehand, while dialing is performed by the user's communication device, and not from a dialing server.

SUMMARY OF THE INVENTION

In accordance with an embodiment of the invention, there is provided a method for initiating a connection between at least a first communication device and a second communication device respective of a first party and a second party, the method comprising:

obtaining a destination subscriber identifier from the first party, wherein the destination subscriber identifier is a string including at least one character different than a numeric character and is respective of the second party;

directly or indirectly conveying a resolution request to a hosting information storage server respective of the destination subscriber identifier, the resolution request includes data indicative of the destination subscriber identifier;

obtaining a resolution response including a destination address respective of the second communication device wherein the second party is available; and initiating a connection between the first communication device and the second communication device.

In accordance with an embodiment of the invention, there is further provided a system in a first communication device, for initiating a connection between at least the first communication device and a second communication device, the first and second communication devices are respective of a first party and a second party, the system comprising:

a resolving module embedded on a machine-readable memory for obtaining a destination subscriber identifier from the first party, wherein the destination subscriber identifier is a string including at least one character different than a numeric character and is respective of the second party;

a transmitting module embedded on a machine-readable memory for directly or indirectly conveying a resolution request to a hosting information storage server respective of the destination subscriber identifier, the resolution request includes data indicative of the destination subscriber identifier; and a call managing module embedded on a machine-readable memory for obtaining a resolution response including a destination address respective of the second communication device wherein the second party is available and for initiating a connection between the first communication device and the second communication device.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6 includes graphic illustrations of registration and updating screens, according to several embodiments of the invention;

FIG. 13 provides an example of an HTTP request used for resolving a subscriber identifier, according to one embodiment of the invention; and FIG. 14 provides an example of an HTTP response used while obtaining a resolution response, according to one embodiment of the invention.

DETAILED DESCRIPTION OF EMBODIMENTS

Figure 1:
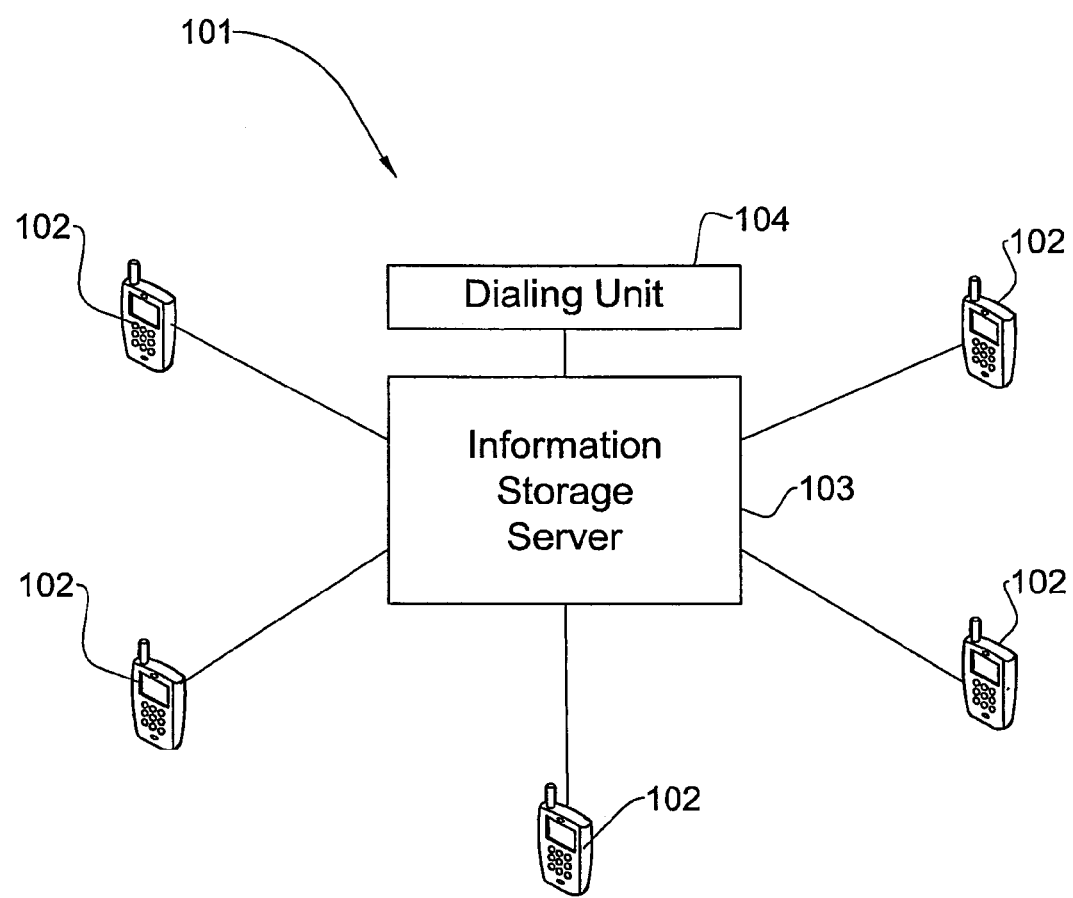
FIG. 1 illustrates a system allowing non-numeral dialing, according to one embodiment of the invention.

In the following description components that are common to more than one figure will be referenced by the same reference numerals.

FIG. 1 illustrates a system 101 allowing non-numeral dialing, according to one embodiment of the invention. According to the embodiment, communication devices 102, such as mobile telephones or more specifically cellular telephones, are coupled to an information storage server 103.

According to the invention, when a user having a communication device 102 wants to dial a number, for initiating a telephone connection such as for placing a telephone call, transmitting a short message (SMS), transmitting a multimedia message (MMS), initiating a facsimile transmission, etc., instead of dialing the destination's number explicitly she can dial a string identifying the destination. The dialed string is conveyed to the information storage server 103, where it is resolved into a number.

It is noted that the dialed string can include any character and is not limited to numeric characters (for convenience, numeric characters are referred to, shortly, as "numerals"). More accurately, according to the invention the dialed string includes at least one character different than a numeric character. In addition, hereinafter the dialing user constitutes a "caller" or a "first party", while the dialed number or string belongs to a "destination" or a "second party". The communication device 102 where the string is dialed is referred to as a "calling communication device".

Further to resolving the dialed string in the information storage server 103 several alternatives exist. According to one embodiment the information storage server 103, or a dialing unit 104 coupled thereto, dials the resolved number in order to call the destination. Then the information storage server 103 or the dialing unit 104 relays the call to the calling communication device, thus allowing communication between the caller and the destination. Alternatively, the information storage server 103 conveys the resolved number to the calling communication device, thus allowing it to call the destination.

It is noted that although FIG. 1 illustrates five communication devices 102, there is no limitation on the number of the communication devices 102 coupled to the information storage server 103. In addition, in the figure, the dialing unit 104 is illustrated as external to the information storage server 103. Yet, this is non-limiting and in other embodiments the dialing unit 104 can be internal to the information storage server 103. Even further, in those embodiments where the information storage server 103 conveys the resolved number to the caller's mobile telephone 102, there may be no dialing unit 104 in the system 101. Furthermore, although in the figure all the illustrated communication devices are mobile telephones, it should be appreciated that this is non-limiting as well, and other communication devices are allowed, such as PDAs, wired-telephones, facsimile machines and others, as long as the communication devices can place a telephone connection between at least two parties. Accordingly, instead of using the term "telephone connection" (e.g., in "initiating a telephone connection"), the more general term "connection" is used (such as "initiating a connection").

It is noted that according to the invention the information storage server 103 can be owned by an "organization" that can be a private organization, a public organization or even a person. For example, a company can have an information storage server 103, where personal information data of the company's employees is stored. Another example is an information storage server 103 owned by a telephone company, wherein the company can store personal information data of its telephony services subscribers. Hereinafter, unless specifically noted, the term "subscriber" refers to a person whose personal information data is stored in an information storage server 103, while according to the invention the personal information data includes at least one telephone number of the subscriber. Yet, personal information data can include additional information such as the subscriber's "electronic mail (email) address", his "web page", his "home address", "business telephone number", "home telephone number", "mobile telephone number", "home address", "business address", "electronic mail (email) address", "Instant Messenger address", etc.

Figure 2:
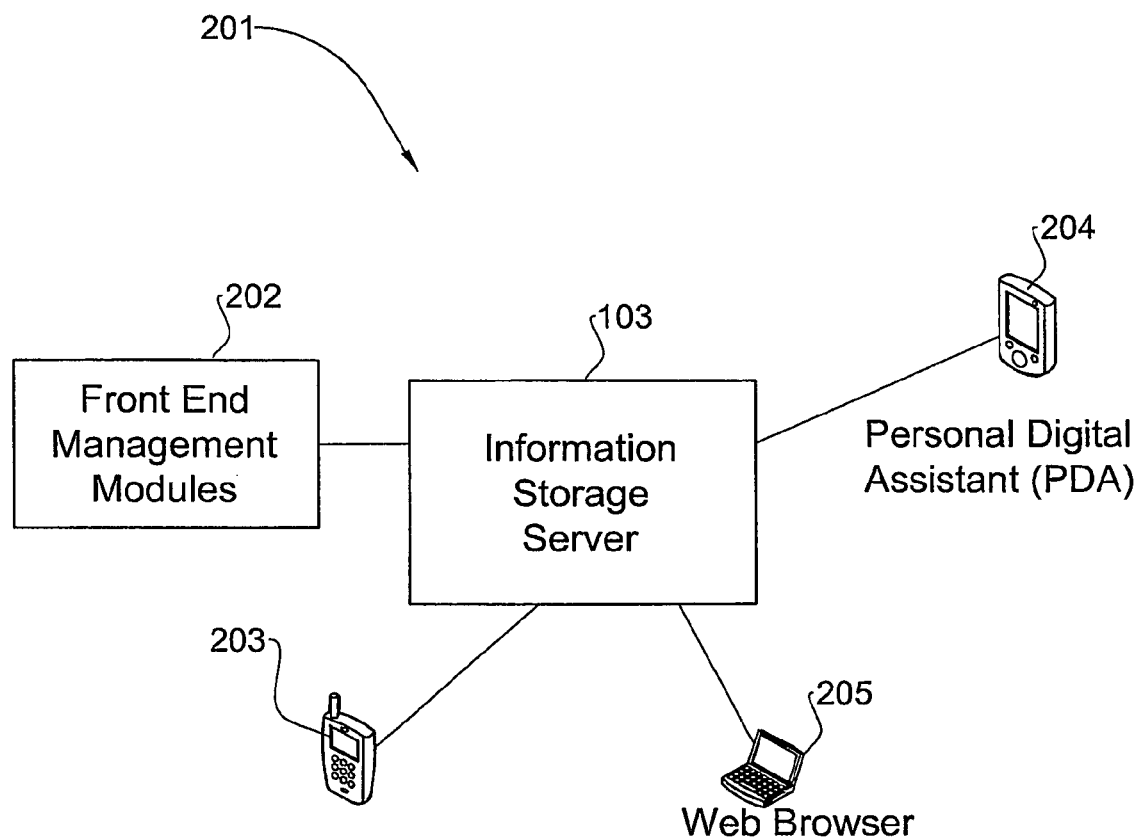
FIG. 2 illustrates a system for managing personal information data stored in an information storage server, according to one embodiment of the invention.

The organization can manage the personal information data stored in the information storage server 103, including adding and removing personal information data stored therein. For example, upon recruitment of a new employee a recruiting company can add the new employee's personal information data to the information storage server 103 owned thereby. FIG. 2 illustrates a system 201 for managing personal information data stored in an information storage server 103, according to one embodiment of the invention. A front end management module 202, coupled to the information storage server 103, is used in order to manage the personal information data stored in the information storage server 103. Although there is only one front end management module 202 illustrated in the figure, it should be appreciated that there may exist zero or any other number of front end management modules 202.

In addition to front end management modules 202, it is possible to manage information stored in the information storage server 103 also via alternative front end modules such as mobile telephones 203 and other devices coupled to the information storage server. Thus, for example, a user whose personal information data is stored in the information storage server 103 can convey thereto an alternative or additional telephone number to be stored in the information storage server 103. It is noted though that a telephone 203 used for personal information data management can be used also as a communication device 102 for dialing strings. However, this is non mandatory and sometimes the telephones 203 are not used for strings dialing. In addition, there may exist additional or alternative front end modules, such as Personal Digital Assistants (PDAs) 204 and/or web browsers 205 and/or others. Therefore, any device coupled to an information storage server and used for managing personal information data stored therein is considered as a front end management module.

Further to FIGS. 1 and 2, it should be understood that according to the invention there may exist more than one information storage server 103: Information storage servers 103 can be owned by more than one organization, while each organization can own one or more information storage servers 103, hence, altogether there may exist more than one information storage server 103 at the same time. A similar situation exists today, e.g., with electronic mail (email) servers, wherein different organizations own one or more email servers. Thus, according to the invention every information storage server 103 has a respective unique identifier, constituting a "server identifier". The server identifier can be a unique value, including a string that includes alphanumeric characters and punctuation marks, such as '.', '_' and others. According to one embodiment, a server identifier can constitute a "domain name", resembling what is common today, for example, with Internet and with email servers.

In addition, every subscriber whose respective personal information data is stored in an information storage server 103, has an identifier that is unique for a particular information storage server 103. This latter identifier constitutes a "subscriber identifier", which like the server identifier, can also be any unique value including a string that includes alphanumeric characters and punctuation marks, such as '.', '_' and others. Hence, if a certain information storage server 103, whose server identifier is, e.g., "SOMESERVER", stores information of a subscriber whose subscriber identifier is "ALMONI", there will be no other subscribers identified as ALMONI whose personal information data is stored in SOMESERVER. Yet, another information storage server 103, whose server identifier is, e.g., "ANOTHERSERVER", can also store personal information data of a subscriber identified as ALMONI, while it should be appreciated that the subscriber identified as ALMONI on SOMESERVER can be similar or different than the subscriber identified as ALMONI on ANOTHERSERVER. Hereinafter, the information storage server storing information of a certain subscriber is referred to as a "hosting information storage server" respective of this subscriber. In the latter example, SOMESERVER is the hosting information server of ALMONI.

It is noted though, that according to one embodiment, the subscriber identifier and the server identifier are always considered as strings, even in those cases when an identifier is composed only of numerals. This is unlike regular telephone numbers, for example, wherein identifiers correspond to telephone lines (unlike subscribers) and wherein dialing is performed by numbers. According to a different embodiment, wherein subscriber identifiers are also considered as strings, the subscriber identifiers must include at least one character which is not numeric, and according to yet another embodiment the identifiers should not include numerals at all. Even further, similar or different policies can be used for server identifiers and for subscriber identifiers. For example, server identifiers of one embodiment are allowed to include numerals while subscriber identifiers are not, etc.

Hereinafter, "subscriber resolution" means obtaining subscriber identification and conveying respective personal information data found or part thereof. Understanding that there may exist more than one information storage server, and if there is more than one information storage server coupled together, it is appreciated that in order to perform subscriber resolution, the subscriber identifier, as well as the respective server identifier, must be determined. According to one embodiment, if the server identifier is known in advance, it is possible to obtain only the subscriber identifier. For example, if it is known that subscriber resolution should be performed on SOMESERVER, it is enough to obtain subscriber identifier (e.g., "ALMONI") in order to resolve the subscriber's personal information data. Yet, this is non-mandatory and other embodiments may require that server identification should be always obtained together with subscriber identifiers.

Figure 3:
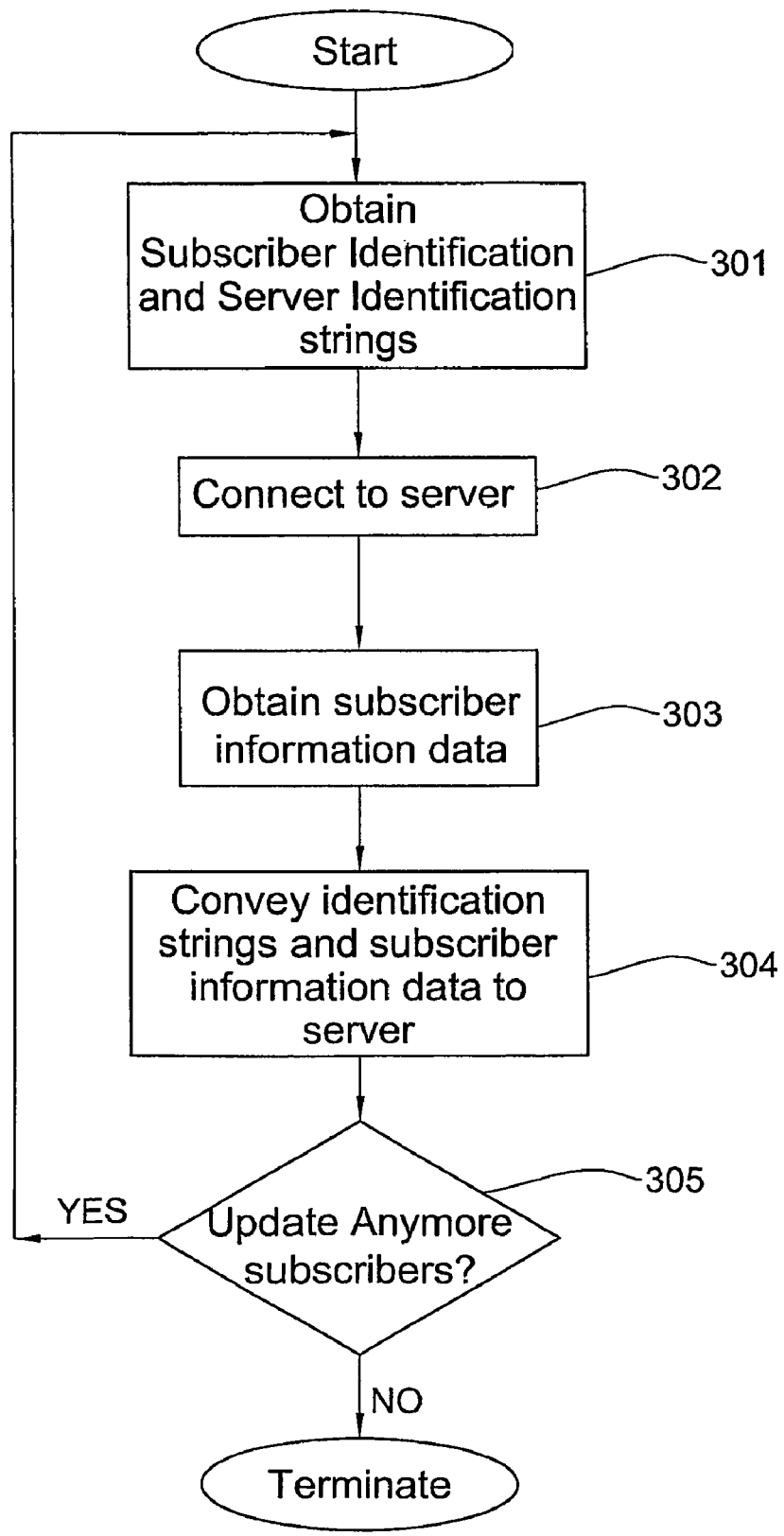
FIG. 3 is a flowchart illustrating registration of subscriber's personal information data in a front end management module, according to one embodiment of the invention.

FIG. 3 is a flowchart illustrating registration of subscriber's personal information data in a front end management module 202, according to one embodiment of the invention. According to the illustrated flowchart, subscriber identifier and server identifier are provided, although it is already understood that other embodiments are allowed as well.

According to the flowchart, the front end management module 202 obtains (301) a subscriber identification string (subscriber identifier) and a server identification string (server identifier). The front end management module 202 may obtain the identifiers from any available source, such as from a user typing the strings on a computer keyboard or on a telephone keypad. It can read the identification strings from a database, it can obtain the strings from a communication line etc. It should be appreciated thus that the front end management module 202 can operate in a manual mode (e.g., when an operator prints the data manually) or it can operate in an automatic mode (e.g., when reading data from a database and using the read data in order to update the server). Upon obtaining the identification strings in 301 the identified server is contacted in 302. Then, on 303 the front end management module 202 obtains the subscriber's personal information data and on 304 it conveys this personal information data to the server. As described with reference to 301, on 303 the front end management module 202 can obtain the personal information from any available source, such as from a user typing the information on a computer keyboard or on a telephone keypad. It can read the personal information from a database, and it can obtain the personal information from a communication line etc. It should be thus be appreciated that also with reference to 303 the front end management module 202 can operate in a manual mode (e.g., when an operator inserts the data manually) or it can operate in an automatic mode (e.g., when reading data from a database and using the read data in order to update the server). The process repeats itself as long as on 305 there are additional subscribers whose personal information data should be registered.

Hence, it is understood that in those cases when 301 and 304 operate in automatic modes, the complete registration method can be handled automatically, without waiting for manual input. The method can thus be used for registering personal information data of a single subscriber, as well as for registering personal information data of many subscribers, e.g., for "bulk subscription".

Yet, the flowchart of FIG. 3 is non-limiting and alternatives are allowed. For example, according to one alternative, obtaining 301 subscriber identification and server identification strings can occur together with obtaining 303 subscriber information data.

Alternatively, a server identification string can be obtained in one operation, e.g., in 301, wherein subscriber identification string and subscriber information data is obtained in another operation, e.g., in 303. Sometimes there is no need for an explicit connection to the server (operation 302) in order to allow conveying identification strings and subscriber information data thereto (304), etc.

Figure 4:
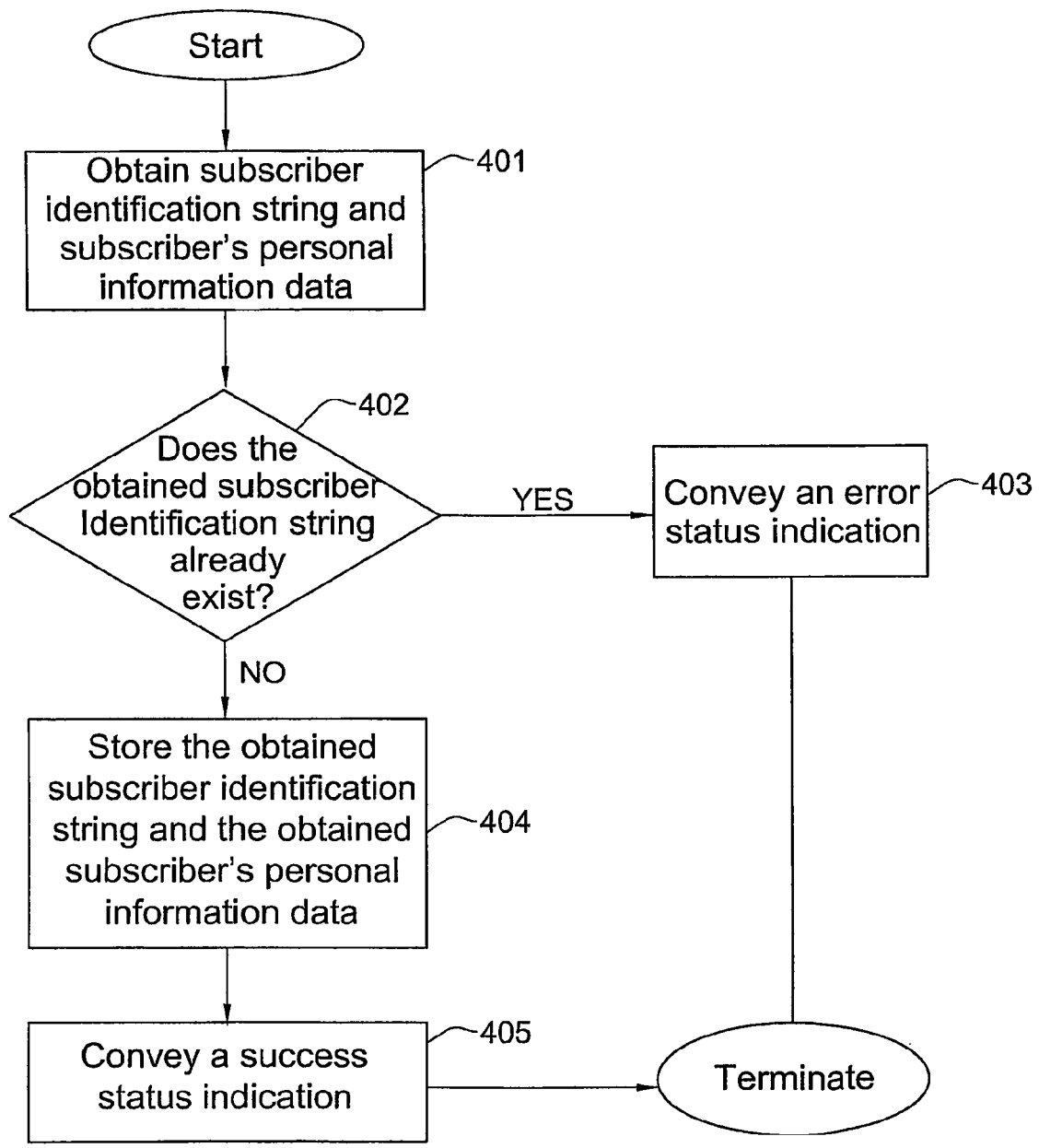
FIG. 4 is a flowchart illustrating registration of subscriber's personal information data in an information storage server, according to one embodiment of the invention.

FIG. 4 is a flowchart illustrating registration of subscriber's personal information data in an information storage server 103, according to one embodiment of the invention. Upon obtaining on 401 a subscriber identification string and personal information data, the information storage server checks on 402 whether a record already exists for a subscriber identification string similar to the one obtained. If so, remembering that a subscriber identification string is unique for a server, the information storage server refuses to register the subscriber's personal information data. According to the embodiment the information storage server conveys on 403 an error status indication, indicative of the failure and its reason. However, if on 402 the server finds out that no such subscriber identification string exists therein, on 404 it stores the obtained subscriber identification string in association with the obtained subscriber personal information data, and on 405 the server conveys a success status indication.

When storing the obtained subscriber identification string in association with the obtained subscriber personal information data, different alternatives are allowed. For example, in accordance with one embodiment, the obtained subscriber personal information data is stored in a database, while the obtained subscriber identification string is used as a key. According to a different embodiment, the obtained subscriber personal information data is stored in a file, while the obtained subscriber identification string serves as the file's name. Other alternatives are allowed as well, as long as the subscriber personal information data can be located while using the subscriber identification string as a search key.

Figure 5:
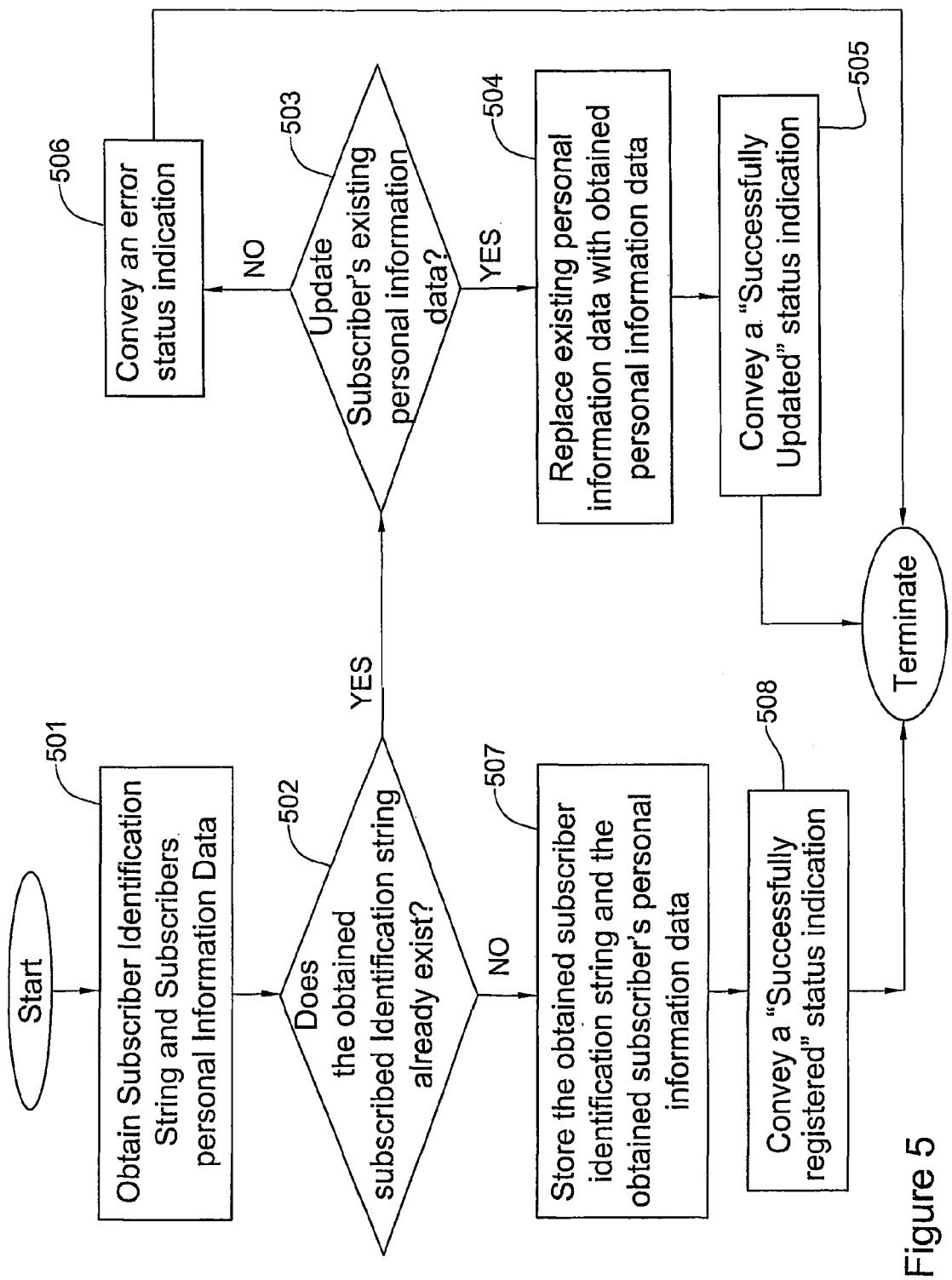
FIG. 5 is a flowchart illustrating registration of subscriber's personal information data in an information storage server, according to an alternative embodiment of the invention.

It should be appreciated that according to the embodiment of FIG. 4 the flowchart provides no mechanism for updating the subscriber' personal information data. Hence, in an alternative embodiment, illustrated by way of example in FIG. 5, personal information data updating is allowed. Similar to the flowchart of FIG. 4, here too, upon obtaining on 501 a subscriber identification string and personal information data, the information storage server checks on 502 whether a record already exists for a subscriber identification string similar to the one obtained. However, unlike FIG. 4, if the subscriber identification string already exists, the information storage server 103 checks on 503 for an indication whether to update the subscriber's personal information data. Such an indication can be provided, for example, as an operation code provided together with the subscriber identification string and personal information data, or in any other way applicable to the case such a preconfigured configuration of the information storage server. If the subscriber's personal information data should be updated, on 504 the personal information data obtained on 501 is stored, thereby replacing the existing personal information data with the obtained personal information data, and on 505 the information storage server 103 conveys an indication that the subscriber's personal information data was successfully updated. Alternatively, if on 503 the information storage server 103 determines that the subscriber's personal information data should not be updated, on 506 an error status indication is conveyed.

Returning to 502, if the information storage server 103 finds that no such subscriber identification string exists therein, on 507 it stores the obtained subscriber identification string in association with the obtained subscriber personal information data, and on 408 the server conveys an indication that the subscriber was successfully registered.

With this object, personal information data are stored in "personal information data items". A personal information data item can include fields for storing the information. Upon registration, or when updating a subscriber's personal information data, data relating to one or more of the available fields can be provided.

In addition, according to one embodiment, each personal information data item can have one of the fields included therein as an active field. For example, Almoni's personal information data includes his home telephone number, his mobile telephone number and his business telephone number. When Almoni is at home he can set his home telephone number to be the active field. When Almoni leaves home on his way to the office, he sets his mobile telephone number to be the active field and then, when reaching the office, he sets the business telephone number as the active field. According to this example, a subscriber can use a mobile telephone or any other front end management module in order to set the active field. Alternatively, Almoni can also set a timer for automatically changing the active fields in his respective personal information data item. For example, at 8:00 am Almoni's mobile telephone number automatically turns into the active field, then at 9:30 am it is Almoni's business telephone number that automatically turns into the active field, at 7:00 pm the active field automatically becomes Almoni's mobile telephone number, and at 8:30 pm it is his home telephone number that comes into effect.

A subscriber can use a front end management module also in order to update personal information data or part thereof, that is, in order to update data stored in one or more fields in his personal information data item. The subscriber can be presented with a form, including fields supported by the information storage server 103, whereupon he is requested to full in mandatory fields (such as the subscriber identifier) and non-mandatory fields. When the subscriber completes filling in his personal information data or part thereof, he approves conveying the data filled in the form to the information storage server 103. Alternatively, there may be certain embodiments allowing subscribers to provide textual commands, for example, by using the command line of a computer front end management module, by sending a short message (SMS) from a mobile telephone, or by conveying such a textual command from an application operating on the front end management module to the information storage server 103. The textual command should include at least indications to those fields whose content should be updated and respective personal information data. In addition, it should be appreciated that textual commands can be used for registering new subscribers, as well as for updating personal information data of already registered subscribers.

FIG. 6 includes graphic illustrations of registration and updating screens, according to several embodiments of the invention. A subscriber, who registers with a subscriber identifier "ALMONI" fills in his home and mobile numbers, which are 111111 and 222222 respectively. According to this example, only the subscriber identification field is mandatory, and indeed, ALMONI does not provide information for the business number field nor for the Custom field. 601 is an illustration of the registration field as it appears just before the subscriber conveys the information to the information storage server 103.

When ALMONI leaves home for a trip, he updates his hotel number as a custom number, as illustrated in 602. The hotel number is 333333. It is noted that the subscriber does not update his home and mobile numbers upon updating his hotel number, leaving them 111111 and 222222 respectively. According to this embodiment custom information should include an indication as to the nature of the information, thus including the word "Hotel". However, this is non-mandatory and other embodiments can include only personal information data, such as "333333" (without the word "Hotel") in this example.

Then, upon returning home, Almoni wishes to delete the hotel number from his personal information data. 603 illustrates the registration and updating screen as it appears before conveying of the data to the server and instructing the server to delete the custom information. According to the present embodiment the subscriber indicates that he wishes to delete content stored in the custom filed by providing a deletion indication. In this non-limiting example the deletion indication is <del>.

From the example provided in 601, 602 and 603, it appears that the same subscriber (Almoni in this case) can update his personal information data whenever he wishes. Appreciating that in mobile telephones, for example, a subscriber normally uses the same telephone device over and over again, it is possible to store frequently used information on the telephone's memory. In this example it is possible to store the subscriber's identifier "Almoni", or even the complete personal information data as this was recently updated or registered. Hence, the form can be filled in automatically, thus including the most recent, updated information.

In an alternative embodiment, instead of providing a deletion flag, the subscriber can delete information by conveying "empty information" in a certain field to the information storage server. Hence, empty information in this embodiment is considered as a deletion indication. Otherwise, if the subscriber wishes to modify information stored in one or more fields, he simply types the updated information therein, replacing the old information. 604 illustrates an update screen wherein further to registration (see 601, for example), the subscriber leaves his home number unchanged, he adds a business number (555555) and a custom number (Hotel 333333) and he changes his mobile number to 444444 (instead of 222222). Then, in 605 the subscriber deletes the custom number according to the latter embodiment, by conveying empty information for the custom field.

Further to storing personal information data in an information storage server 103, whether storing newly registered information or updated information, the personal information data can be used for offering an automatic online dialing directory. Instead of dialing a telephone number, as is presently done while placing a call from a telephone, according to several embodiments of the invention the caller will type a subscriber identifier. In response, the telephone will convey the subscriber identifier to an information storage server for resolving a destination number, consequently calling the destination number, thus allowing a conversation between the caller and the destination. For example, a caller wants to call his friend "Almoni Johns", who works for a corporate named "Someplace". Someplace owns an information storage server named "SomeServer", i.e., SomeServer is Almoni's hosting information storage server. Almoni Johns' subscriber identifier is Almoni, and hence the caller prints "almoni<someserver>" on his telephone. Consequently the caller's telephone conveys the subscriber identifier "almoni" to the information storage server "Somewhere", where it is being resolved to the telephone number 7777777. Thus, the number 7777777 is dialed, allowing the caller to talk to Almoni Johns.

According to one embodiment of the invention the caller telephone or any other communication device 102 used by the caller, should be equipped with a "resolving module", which can be, e.g., a computer program. According to one embodiment, illustrated in FIG. 7, upon obtaining a subscriber identifier on 701, the resolving module conveys it, on 702, to the respective hosting information storage server. The subscriber identifier, when conveyed to the hosting information storage server, constitutes, or is part of a resolution request.

According to one embodiment, in order to convey the resolution request to the hosting information storage server, the resolving module is coupled to a default information storage server, constituting a "home information storage server". The resolving module conveys the resolution request to its respective home information storage server, which further relays it to the hosting information storage server. Relaying can be direct or indirect, while direct relaying means that the home information storage server conveys the resolution request directly to the hosting information storage server, while indirect relaying means that the home information storage server conveys the resolution request to a middle entity accessible thereto and the middle entity forwards the resolution request further, so in the end it will reach the hosting information storage server. A middle entity can be an information storage server, but it can also be any other entity adapted for forwarding data from one information storage server to another. Hereinafter, unless specifically noted, wherever it is described that the resolving module conveys or obtains data (including personal information data, resolution requests, telephone numbers and/or any other data) to or from an information storage server, it should be realized that the resolving module can directly or indirectly convey or obtain the data.

In addition, there may exist more than one way to convey the subscriber identifier to the respective hosting information storage server. One way is by using Short Message Service (SMS), wherein the query request is carried by an SMS message sent to the home information storage server. Further to understanding that the subscriber identifier can be carried by an SMS message, it can be appreciated that it can also be carried by using Multimedia Messaging Service (known as MMS). Other alternatives are connecting to the home information storage server via the Internet and transmitting the query message thereto; conveying the subscriber identifier via USSD ("Unstructured Supplementary Services Data" of GSM), conveying the subscriber identifier via CAMEL (The European Telecommunications Standards Institute's "Customized Applications for Mobile network Enhanced Logic"), via HTTP (HyperText Transfer Protocol), etc.

Figure 7:
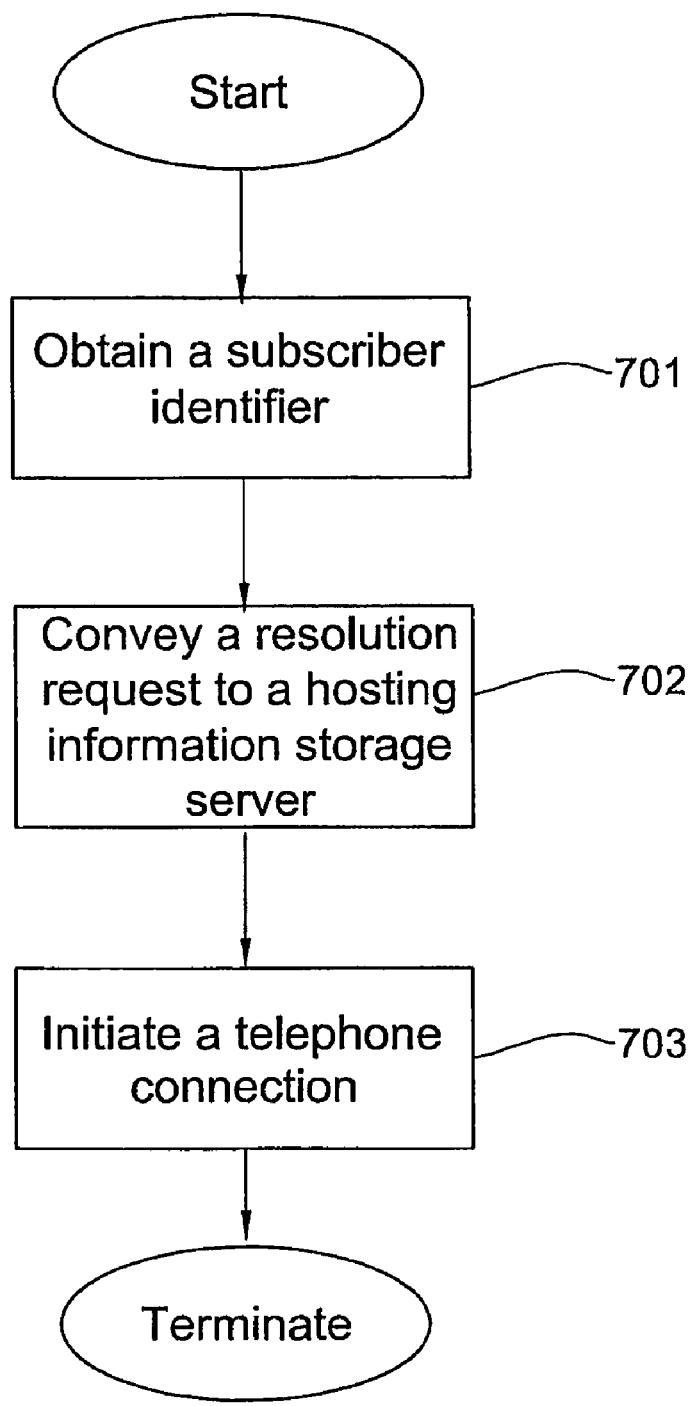
FIG. 7 is a flowchart describing the main procedure of initiating a telephone connection between a first party and a second party, according to one embodiment of the invention.
Figure 8:
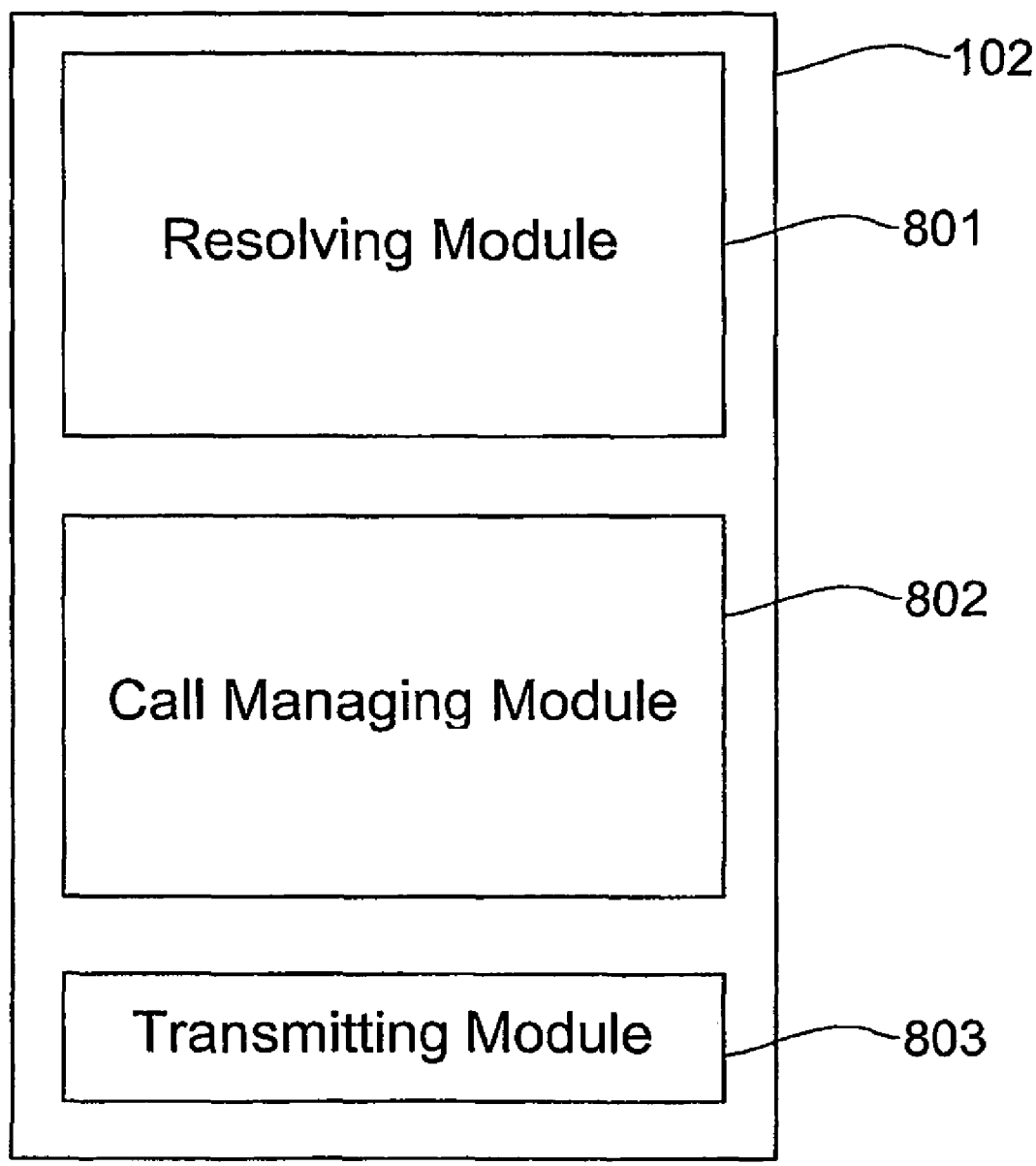
FIG. 8 is a block diagram illustrating the main modules included in a communication device, according to one embodiment of the invention.

Returning to the flowchart of FIG. 7, further to conveying the resolution request to the home information storage server, on 703 the caller's telephone initiates a telephone connection with the destination. It is noted though that the invention is not limited to telephones and other communication devices can be used instead, as mentioned earlier, e.g. with reference to FIG. 1. There may exist a call managing module in charge of initiating the telephone connection. The resolving module 801 and the call managing module 802 are illustrated in FIG. 8, which is a block diagram illustrating the main modules included in a communication device 102, according to one embodiment of the invention. The communication device 102 of FIG. 8 includes also a transmitting module 803 for conveying resolution requests to the information storage server.

Figure 9:
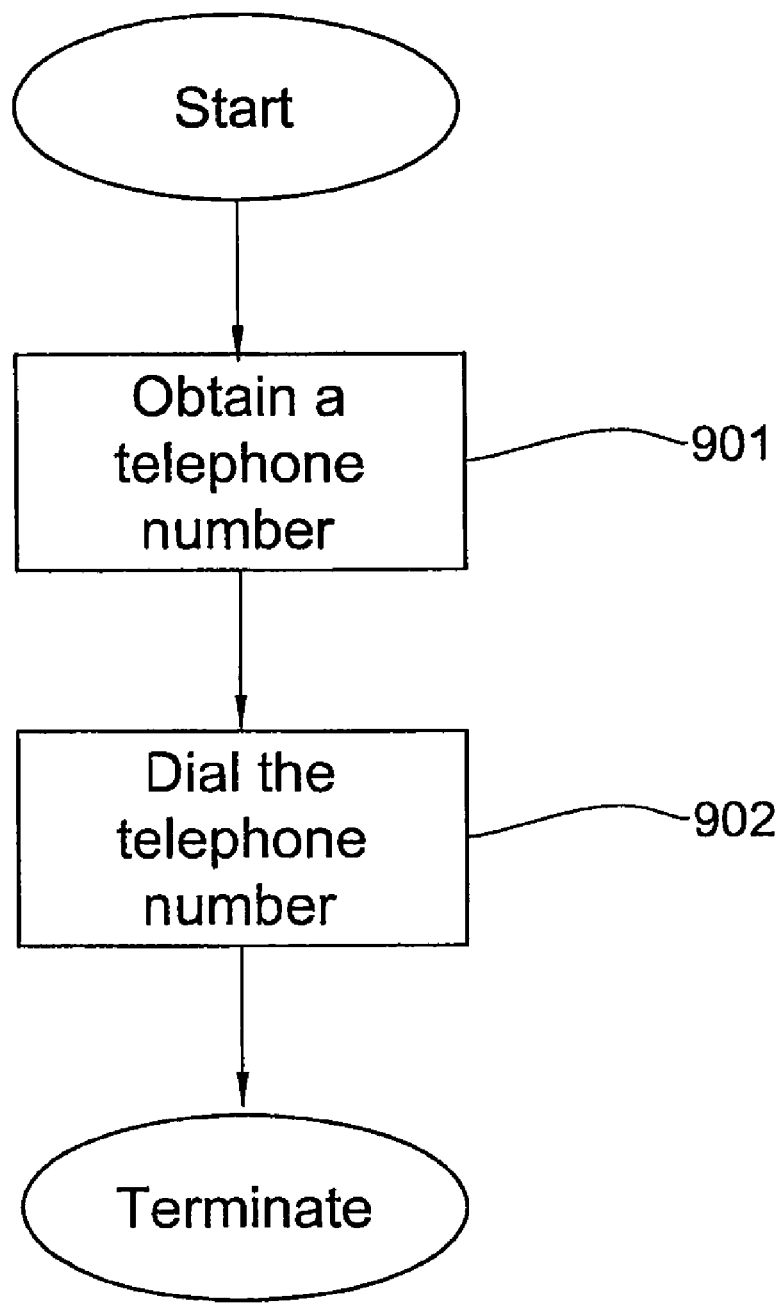
FIG. 9 is a flowchart illustrating active telephone connection initialization, according to one embodiment of the invention.

Turning now to the call managing module 802, it should be realized that a connection initialization can be either passive or active. FIG. 9 is a flowchart illustrating active connection initialization, according to one embodiment of the invention. On 901 the call managing module 802 obtains a telephone number, referred also as a destination number, in response to a query message, and on 902 it automatically dials the received number in order to initialize the connection. Yet, this is non-limiting and instead of automatically dialing the number the call managing module 802 can display it on the communication device screen, for example, thus allowing the operator to manually initialize the call.

Figure 10:
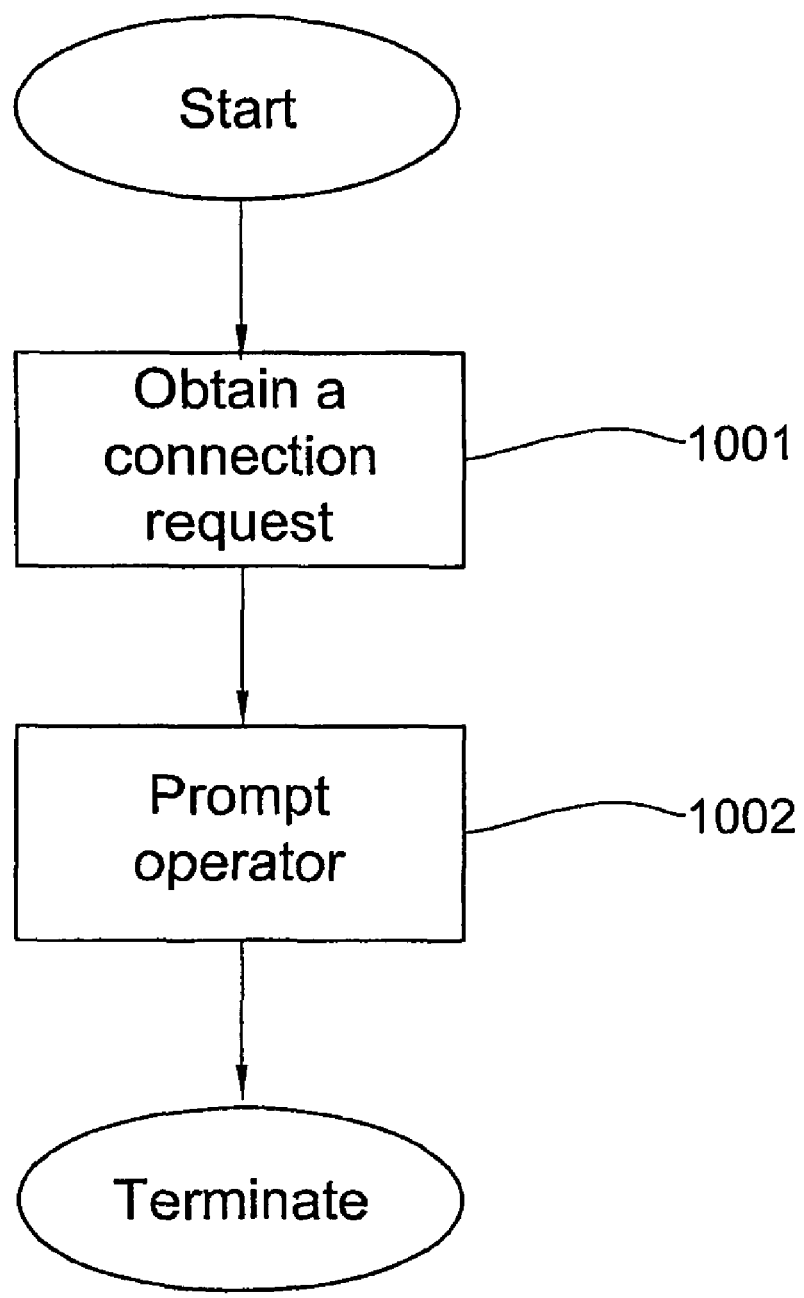
FIG. 10 is a flowchart illustrating passive telephone connection initialization, according to one embodiment of the invention.

FIG. 10 is a flowchart illustrating passive connection initialization, according to one embodiment of the invention. Passive call initialization means that the call is actively initiated by another party, e.g., the home information storage server or any other calling entity adapted for the task. The calling entity calls the destination number and the caller, and connects the two calls. According to this embodiment on 1001 the call managing module 802 obtains a connection request, such as Signaling System #7 (SS7) connection request, Session Initiation Protocol (SIP) connection request or any other connection request depending on the type of communication device in use. Responsive to the connection request, on 1002 the call managing module 802 prompts the user of the connection request, e.g., by ringing, flashing on the screen etc., thus allowing the operator to answer the call.

Figure 11:
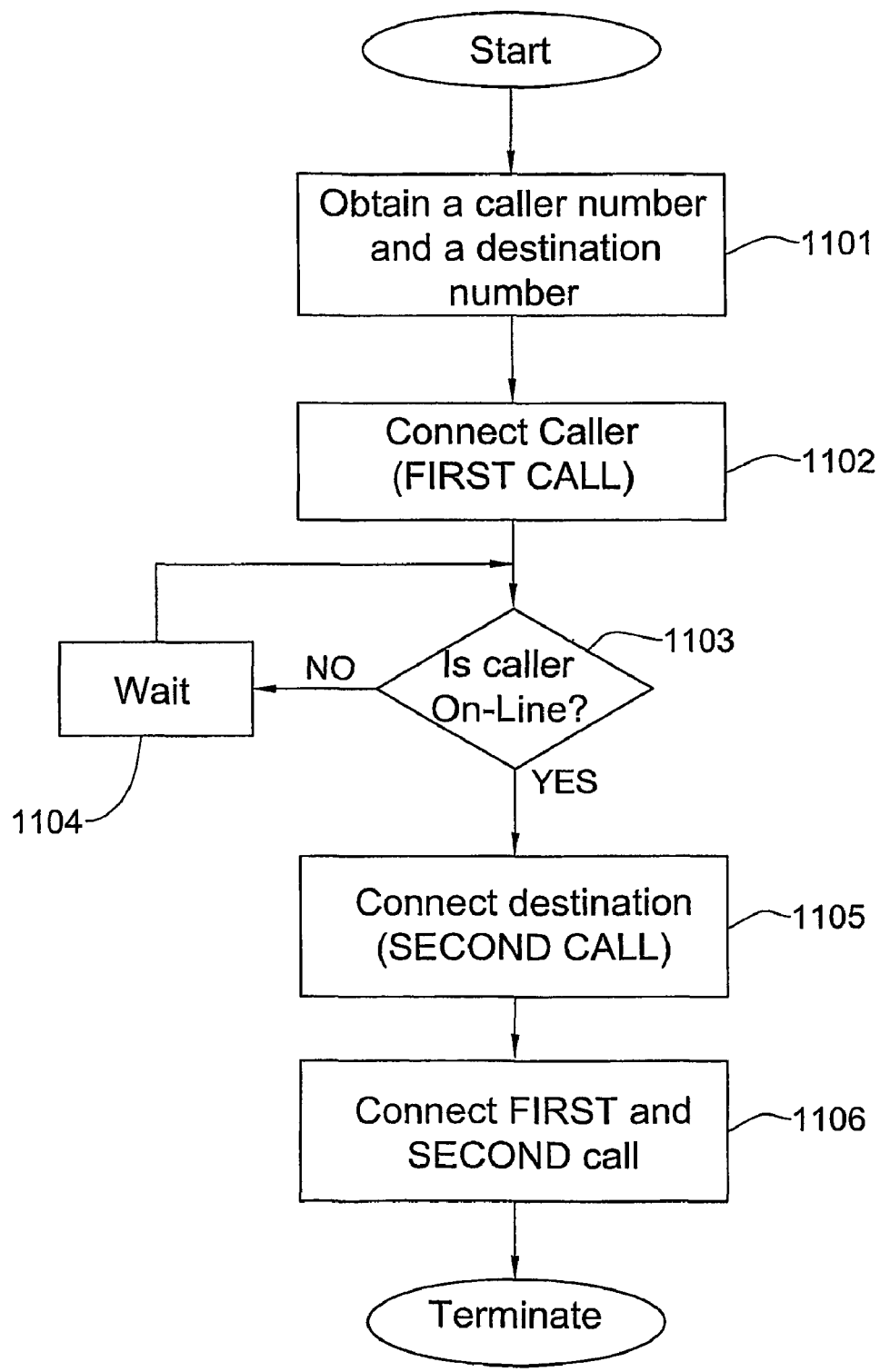
FIG. 11 is a flowchart illustrating operations taken by a calling entity, according to one embodiment of the invention.

FIG. 11 is a flowchart illustrating operations taken by a calling entity, according to one embodiment of the invention.

Responsive to a query request, on 1101 the calling entity obtains a telephone number. It should be understood that the telephone number is a destination (or "second party") telephone number. In addition, the invention is not limited to numbers. For example, instead of a number, the calling entity can obtain an address of an Internet telephone, a messenger allowing vocal conversations etc. Therefore, instead of the word "number" in the terms "telephone number", "destination number", "destination telephone number", "second party number" etc., the word "address" can be used (e.g., "destination address", "second party address", etc.) On 1102 the calling entity sends a connection request to the caller and waits until the caller answers the call (see 1103 and 1104). The call between the calling entity and the caller constitutes a "first call" while it should be appreciated that if the caller's line is busy according to certain embodiments, the calling entity retries to connect to the first call. Yet, other alternatives are also allowed, such as terminating immediately further to detecting that the line is busy. In addition, if the caller line is ringing, or if the calling entity receives a call waiting signal etc., the calling entity can wait a certain time period for the caller to answer the call, or it can abort the call.

When the caller answers the first call (in 1103), on 1105 the calling entity sends a connection request to the destination in order to start a connection thereto, constituting a "second call". Although not illustrated in the flowchart, here too the calling entity can retry connecting to a busy line and/or wait on a ringing/call waiting signals etc., until the destination answers the call, and then, on 1106, the calling entity according to the invention connects the first and second calls, allowing a connection between the two parties. However, according to a different embodiment, immediately after connecting to the caller on 1103 the calling entity can request a connection to the destination (1105) and on 1106 bridge the two calls. In this case, if the destination line is busy, for example, the caller will hear the busy tone.

It will be understood that the calling entity can connect two calls, each thereof using a different protocol and technology. For example, the first call can be a regular telephony call (e.g., using SS7) while the second call can be an Internet telephony call (e.g., using SIP). The calling entity in this case forms a gateway, allowing connection between the two parties using different protocols.

Figure 12:
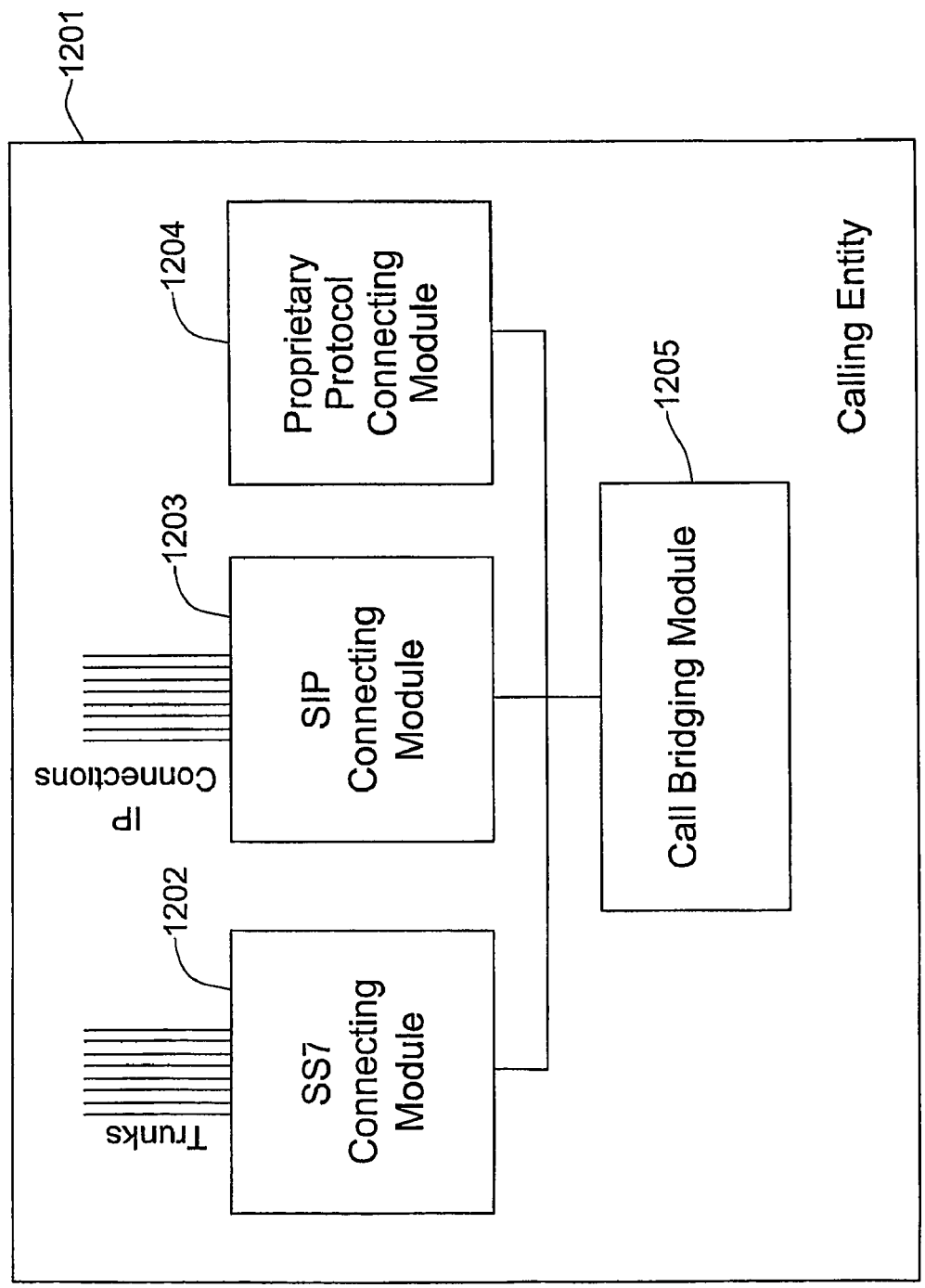
FIG. 12 is a block diagram illustrating a calling entity, according to one embodiment of the invention.

FIG. 12 is a block diagram illustrating a calling entity 1201, according to one embodiment of the invention. According to the illustrated embodiment the calling entity includes an SS7 connecting module 1202, that allows initiating calls to regular telephones and hence it is connected to regular telephony networks via trunks. In order to allow calls to Voice Over IP (VoIP) devices, the illustrated calling entity is connected also via IP connections and it includes a SIP connecting module 1203. Yet this is non-limiting and the calling entity can connect to any required communication device as long as it includes a proper connecting module. The presently illustrated calling entity allows, for example, connections also to a proprietary protocol via the proprietary protocol connecting module 1204.

In addition to the connecting modules 1202, 1203 and others, the calling entity 1201 includes also a call bridging module 1205, for connecting between calls (see, for example, 1106 in FIG. 11).

It is noted that the embodiments described above provide a description of a connection between two parties. However, this is not limiting and further to reading the description a person versed in the art would appreciate that the invention can be used also for multiple parties' communication, such as conference calls. Furthermore, upon receiving a call it is presently common to display the calling number (calling ID information) on the receiver's screen. According to another embodiment of the invention, upon receiving a call with calling ID information, the receiver's telephone can directly or indirectly convey a reversed resolution request to a hosting information storage server (103), wherein the reversed resolution request includes data indicative of the calling ID information. It is appreciated that in this case the reversed resolution request is indicative of the calling ID, which is normally a telephone number, while the response to the reversed resolution request can include any information stored in the personal information data item respective of the calling party, if such information exists. Therefore, upon obtaining a response to the reversed resolution request including information respective of the calling party, it is possible to display the information on the receiver's screen. For example, it is possible to display the calling party's name instead of his number. In addition, or instead, it is possible to display his address, his title (Mr., Ms., Dr., etc.) or any other information obtained in response to the reversed resolution request.

Attention is drawn now to resolving, e.g., in 702 of FIG. 7, with reference therewith it was explained that the subscriber identifier can be conveyed, e.g., via SMS, MMS, USSD, HTTP or CAMEL, all are protocols known to those versed in the art. FIG. 13 provides an example of an HTTP request used for resolving a subscriber identifier, according to one embodiment of the invention, wherein "ENCODED DATA" represents the subscriber identifier to be resolved. It should be appreciated that the subscriber identifier represented by the request can be encoded, if required, yet this is not mandatory. In addition, it should also be appreciated that in the resolution request illustrated in FIG. 13 there is only one query for resolution of a single subscriber identifier. Yet, this is non-limiting too and it is possible to include two or more different subscriber identifiers in a single resolution request.

FIG. 14, on the other hand, provides an example of an HTTP response used while obtaining a resolution response, according to one embodiment of the invention. In the illustrated message the xx (in the Content Length field) stands for the length of the response body in bytes, ENCODED_NAME stands for the subscriber identifier, ENCODED_DOMAIN is the server identifier, and the NUMBER, EMAIL and ADDRESS fields are used to carry the destination address as required. It is noted that in the example of FIG. 14 eXtended Markup Language (XML) is used in the message body. As mentioned with reference to FIG. 13, here too the data can be encoded (e.g., the subscriber and/or server identifiers), if required, yet this is not mandatory.

Even further, it should be appreciated that the resolution response can be combined from more than one message that can be of the same or of different protocols. For example, if the resolution request included more than one subscriber identifier, it is possible to convey the subscribers' addresses in one message (e.g., one HTTP message carrying all the subscribers' addresses) or in more than one message (e.g., more than one HTTP messages, each carrying the address of one subscriber). Yet, this is non-limiting and in case more than one message is conveyed as a resolution response, this more than one message can be also of different types. For example, the resolution request can convey an address of the subscriber as well as a photo of the subscriber (or of another subscriber). In such case it may be preferable to convey the address in one message type (e.g., HTTP or SMS) and the photo in another message type (e.g., MMS or USSD). Therefore, it should be appreciated that the resolution response can generally be carried by at least one of a short message (SMS), a multimedia message (MMS), an Unstructured Supplementary Services Data (USSD) response, an HyperText Transfer Protocol (HTTP) and other protocols.

In addition, further to the embodiments described above it will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A system adding a alpha-numeric dialing functionality including alphabetic dialing to a first plurality of caller communication devices which can be dialed only numerically to a second plurality of telephone numbers, the first plurality of caller communication devices being interconnected via a communication network which supports dialing from the first plurality of caller communication devices to a second plurality of telephone numbers, the system comprising:

apparatus for installing software in at least one SIM cards configured to reside respectively in at least one of the first plurality of communication devices; and a resolver server communicating with the communication network, storing a second plurality of call-names respectively corresponding to said second plurality of telephone numbers, and being operative for receiving an individual one of said second plurality of call-names dialed by an individual one of said first plurality of communication devices and for sending an individual one of said second plurality of telephone numbers corresponding to said individual one of said second plurality of call-names to said software installed on said individual one of said first plurality of communication devices, and wherein the software is operative for receiving, from said resolver server, said individual one of said second plurality of telephone numbers, and for establishing a telephone connection from said individual one of said first plurality of communication devices to said individual one of said second plurality of telephone numbers.

2. A system according to claim 1 and also comprising apparatus for sending the call-name to said resolver server via a USSD (Unstructured Supplementary Services Data) request.

3. A system according to claim 1 and also comprising apparatus for sending the call-name to said resolver server via SMS.

4. A system according to claim 1 and wherein said resolver server is operative to send an individual one of said second plurality of telephone numbers corresponding to said individual one of said second plurality of call-names from said resolver server to said software installed on said individual one of said first plurality of communication devices.

5. A system according to claim 1 and wherein said software is operative to receive, from said resolver server, said individual one of said second plurality of telephone numbers, and to establish a telephone connection from said individual one of said first plurality of communication devices to said individual one of said second plurality of telephone numbers.

6. A system according to claim 4 wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

7. A system according to claim 1 and wherein said software is installed in at least one individual device from among the first plurality of communication devices, externally to a SIM card configured to reside in said individual device.

8. A system according to claim 1 and wherein at least one device from among said first plurality of communication devices, when dialed, sends only digits to its supporting communication network and does not support any alphabetical dialing beyond conventional address-book based dialing, in which an alphabetical string previously stored in the communication device's address book in association with a telephone number, is dialed by a callee.

9. A system according to claim 1 and also comprising Internet apparatus for sending the call-name to said resolver server via IP (Internet protocol).

10. A system according to claim 1 and also comprising telephone apparatus for using said telephone connection for placing a telephone call.

11. A system according to claim 1 and also comprising MMS apparatus for sending the call-name to said resolver server via a multimedia message (MMS).

12. A system according to claim 1 and also comprising HTTP apparatus for sending the call-name to said resolver server via a HyperText Transfer Protocol (HTTP) request.

13. A system according to claim 1 and wherein said software is installed remotely in at least one SIM cards.

14. A system according to claim 1 and also comprising SMS apparatus for using said telephone connection for transmitting a short message (SMS).

15. A system according to claim 1 and also comprising MMS apparatus for using said telephone connection for transmitting a multimedia message (MMS).

16. A system according to claim 1 and also comprising email transmission apparatus for using said telephone connection for transmitting an email message.

17. A system according to claim 1 and also comprising using facsimile apparatus for using said telephone connection for transmitting a facsimile transmission.

18. A system according to claim 1 wherein at least some of said first plurality of communication devices comprises telephones.

19. A system according to claim 18 wherein at least some of said telephones comprise cellular telephones.

20. A system according to claim 18 wherein at least some of said telephones comprise mobile telephones.

21. A system according to claim 1 and also operative for sending the call-name to said resolver server via a USSD (Unstructured Supplementary Services Data) request.

22. A system according to claim 1 and also operative for sending the call-name to said resolver server via SMS.

23. A system according to claim 1 and wherein said resolver server is used to send an individual one of said second plurality of telephone numbers corresponding to said individual one of said second plurality of call-names from said resolver server to said software installed on said individual one of said first plurality of communication devices, wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

24. A system according to claim 1 and wherein said software is installed in at least one individual device from among the first plurality of communication devices, externally to a SIM card configured to reside in said individual device.

25. A system according to claim 1 and wherein the call-name is sent to said resolver server via IP (Internet protocol).

26. A system according to claim 1 operative for using said telephone connection for placing a telephone call.

27. A system according to claim 1 operative for sending the call-name to said resolver server via a HyperText Transfer Protocol (HTTP) request.

28. A system according to claim 1 and wherein said software is installed remotely in at least one SIM cards.

29. A system according to claim 1 wherein at least some of said first plurality of communication devices comprises telephones, wherein at least some of said telephones comprise cellular telephones.

30. A system according to claim 1 wherein at least some of said first plurality of communication devices comprises telephones, wherein at least some of said telephones comprise mobile telephones.

31. A method for adding a alpha-numeric dialing functionality including alphabetic dialing to a first plurality of communication devices which can be dialed only numerically to a second plurality of telephone numbers, the first plurality of communication devices being interconnected via a communication network which supports dialing from the first plurality of communication devices to a second plurality of telephone numbers, the method comprising:
   installing software in at least one of the first plurality of communication devices; and
   storing in a resolver server communicating with the communication network, a second plurality of call-names respectively corresponding to said second plurality of telephone numbers,
   wherein said resolver server is operative for receiving, via a USSD (Unstructured Supplementary Services Data) request, an individual one of said second plurality of call-names dialed by an individual one of said first plurality of communication devices, and for sending an individual one of said second plurality of telephone numbers corresponding to said individual one of said second plurality of call-names to said software installed on said individual one of said first plurality of communication devices,
   and wherein the software is operative for receiving, from said resolver server, said individual one of said second plurality of telephone numbers, and establishing a telephone connection from said individual one of said first plurality of communication devices to said individual one of said second plurality of telephone numbers.

32. A method according to claim 31 and also comprising sending the call-name to said resolver server via a USSD (Unstructured Supplementary Services Data) request.

33. A method according to claim 31 and also comprising sending the call-name to said resolver server via SMS.

34. A method according to claim 31 and also comprising using said resolver server to send an individual one of said second plurality of telephone numbers corresponding to said individual one of said second plurality of call-names from said resolver server to said software installed on said individual one of said first plurality of communication devices.

35. A method according to claim 31 and also comprising using said software to receive, from said resolver server, said individual one of said second plurality of telephone numbers, and to establish a telephone connection from said individual one of said first plurality of communication devices to said individual one of said second plurality of telephone numbers.

36. A method according to claim 34 wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

37. A method according to claim 31 and wherein said software is installed in at least one individual device from among the first plurality of communication devices, externally to a SIM card configured to reside in said individual device.

38. A method according to claim 31 and wherein at least one device from among said first plurality of communication devices, when dialed, sends only digits to its supporting communication network and does not support any alphabetical dialing beyond conventional address-book based dialing, in which an alphabetical string previously stored in the communication device's address book in association with a telephone number, is dialed by a callee.

39. A method according to claim 31 and also comprising sending the call-name to said resolver server via IP (Internet protocol).

40. A method according to claim 31 and also comprising using said telephone connection for placing a telephone call.

41. A method according to claim 31 and also comprising sending the call-name to said resolver server via a multimedia message (MMS).

42. A method according to claim 31 and also comprising sending the call-name to said resolver server via a HyperText Transfer Protocol (HTTP) request.

43. A method according to claim 31 and wherein said software is installed remotely in at least one SIM cards.

44. A method according to claim 31 and also comprising using said telephone connection for transmitting a short message (SMS).

45. A method according to claim 32 and also comprising using said telephone connection for transmitting a multimedia message (MMS).

46. A method according to claim 31 and also comprising using said telephone connection for transmitting an email message.

47. A method according to claim 31 and also comprising using said telephone connection for transmitting a facsimile transmission.

48. A method according to claim 31 wherein at least some of said first plurality of communication devices comprises telephones.

49. A method according to claim 48 wherein at least some of said telephones comprise cellular telephones.

50. A method according to claim 48 wherein at least some of said telephones comprise mobile telephones.

51. A system for adding a alpha-numeric dialing functionality including alphabetic dialing to a first plurality of communication devices which can be dialed only numerically to a second plurality of telephone numbers, the first plurality of communication devices being interconnected via a communication network which supports dialing from the first plurality of communication devices to a second plurality of telephone numbers, the system comprising:
   apparatus for installing software in at least one of the first plurality of communication devices; and a resolver server communicating with the communication network and storing a second plurality of call-names respectively corresponding to said second plurality of telephone numbers, wherein said resolver server is operative for receiving, via SMS, an individual one of said second plurality of call-names dialed by an individual one of said first plurality of communication devices, and for sending an individual one of said second plurality of telephone numbers corresponding to said individual one of said second plurality of call-names to said software installed on said individual one of said first plurality of communication devices, and wherein the software is operative for receiving, from said resolver server, said individual one of said second plurality of telephone numbers, and establishing a telephone connection from said individual one of said first plurality of communication devices to said individual one of said second plurality of telephone numbers.

52. A system according to claim 51 and also operative for sending the call-name to said resolver server via a USSD (Unstructured Supplementary Services Data) request.

53. A system according to claim 51 and also operative for sending the call-name to said resolver server via SMS.

54. A system according to claim 51 and wherein said resolver server is used to send an individual one of said second plurality of telephone numbers corresponding to said individual one of said second plurality of call-names from said resolver server to said software installed on said individual one of said first plurality of communication devices, wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

55. A system according to claim 51 and wherein said software is installed in at least one individual device from among the first plurality of communication devices, externally to a SIM card configured to reside in said individual device.

56. A system according to claim 51 and wherein the call-name is sent to said resolver server via IP (Internet protocol).

57. A system according to claim 51 operative for using said telephone connection for placing a telephone call.

58. A system according to claim 51 operative for sending the call-name to said resolver server via a HyperText Transfer Protocol (HTTP) request.

59. A system according to claim 51 and wherein said software is installed remotely in at least one SIM cards.

60. A system according to claim 51 wherein at least some of said first plurality of communication devices comprises telephones, wherein at least some of said telephones comprise cellular telephones.

61. A system according to claim 51 wherein at least some of said first plurality of communication devices comprises telephones, wherein at least some of said telephones comprise mobile telephones.

62. A system for adding a alpha-numeric dialing functionality including alphabetic dialing to a first plurality of communication devices which can be dialed only numerically to a second plurality of telephone numbers, the first plurality of communication devices being interconnected via a communication network which supports dialing from the first plurality of communication devices to a second plurality of telephone numbers, the system comprising:

apparatus for installing software in at least one of the first plurality of communication devices; and a resolver server communicating with the communication network and storing a second plurality of call-names respectively corresponding to said second plurality of telephone numbers, wherein said resolver server is operative for receiving, via a USSD (Unstructured Supplementary Services Data) request, an individual one of said second plurality of call-names dialed by an individual one of said first plurality of communication devices, and for sending an individual one of said second plurality of telephone numbers corresponding to said individual one of said second plurality of call-names to said software installed on said individual one of said first plurality of communication devices, and wherein the software is operative for receiving, from said resolver server, said individual one of said second plurality of telephone numbers, and establishing a telephone connection from said individual one of said first plurality of communication devices to said individual one of said second plurality of telephone numbers.

63. A system according to claim 62 and also operative for sending the call-name to said resolver server via a USSD (Unstructured Supplementary Services Data) request.

64. A system according to claim 62 and also operative for sending the call-name to said resolver server via SMS.

65. A system according to claim 62 and wherein said resolver server is used to send an individual one of said second plurality of telephone numbers corresponding to said individual one of said second plurality of call-names from said resolver server to said software installed on said individual one of said first plurality of communication devices, wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

66. A system according to claim 62 and wherein said software is installed in at least one individual device from among the first plurality of communication devices, externally to a SIM card configured to reside in said individual device.

67. A system according to claim 62 and wherein the call-name is sent to said resolver server via IP (Internet protocol).

68. A system according to claim 62 operative for using said telephone connection for placing a telephone call.

69. A system according to claim 62 operative for sending the call-name to said resolver server via a HyperText Transfer Protocol (HTTP) request.

70. A system according to claim 62 and wherein said software is installed remotely in at least one SIM cards.

71. A system according to claim 62 wherein at least some of said first plurality of communication devices comprises telephones, wherein at least some of said telephones comprise cellular telephones.

72. A system according to claim 62 wherein at least some of said first plurality of communication devices comprises telephones, wherein at least some of said telephones comprise mobile telephones.

73. A method for adding a alpha-numeric dialing functionality including alphabetic dialing to a first plurality of communication devices which can be dialed only numerically to a second plurality of telephone numbers, the first plurality of communication devices being interconnected via a communication network which supports dialing from the first plurality of communication devices to a second plurality of telephone numbers, the method comprising:

installing software in at least one of the first plurality of communication devices; and storing in a resolver server communicating with the communication network, a second plurality of call-names respectively corresponding to said second plurality of telephone numbers, wherein said resolver server is operative for receiving, via SMS, an individual one of said second plurality of call-names dialed by an individual one of said first plurality of communication devices, and for sending an individual one of said second plurality of telephone numbers corresponding to said individual one of said second plurality of call-names to said software installed on said individual one of said first plurality of communication devices, and wherein the software is operative for receiving, from said resolver server, said individual one of said second plurality of telephone numbers, and establishing a telephone connection from said individual one of said first plurality of communication devices to said individual one of said second plurality of telephone numbers.

74. A method according to claim 73 and also comprising sending the call-name to said resolver server via a USSD (Unstructured Supplementary Services Data) request.

75. A method according to claim 73 and also comprising sending the call-name to said resolver server via SMS.

76. A method according to claim 73 and also comprising using said resolver server to send an individual one of said second plurality of telephone numbers corresponding to said individual one of said second plurality of call-names from said resolver server to said software installed on said individual one of said first plurality of communication devices, wherein said resolver server sends the individual one of said second plurality of telephone numbers corresponding to said individual one of said second plurality of call-names to said software in at least one of: a short message (SMS), a multimedia message (MMS), an Unstructured Supplementary Services Data (USSD) response and a HyperText Transfer Protocol (HTTP) response.

77. A method according to claim 73 and wherein said software is installed in at least one individual device from among the first plurality of communication devices, externally to a SIM card configured to reside in said individual device.

78. A method according to claim 73 and also comprising sending the call-name to said resolver server via IP (Internet protocol).

79. A method according to claim 73 and also comprising using said telephone connection for placing a telephone call.

80. A method according to claim 73 and also comprising sending the call-name to said resolver server via a HyperText Transfer Protocol (HTTP) request.

81. A method according to claim 73 and wherein said software is installed remotely in at least one SIM cards.

82. A method according to claim 73 wherein at least some of said first plurality of communication devices comprises telephones, wherein at least some of said telephones comprise cellular telephones.

83. A method according to claim 73 wherein at least some of said first plurality of communication devices comprises telephones, wherein at least some of said telephones comprise mobile telephones.

84. A computer program product, comprising a tangible computer usable medium having a computer readable program code embodied therein, said computer readable program code adapted to be executed to implement a method for adding a alpha-numeric dialing functionality including alphabetic dialing to a first plurality of caller communication devices which can be dialed only numerically to a second plurality of telephone numbers, the first plurality of caller communication devices being interconnected via a communication network which supports dialing from the first plurality of caller communication devices to a second plurality of telephone numbers, the method comprising:

installing software in at least one SIM cards configured to reside respectively in at least one of the first plurality of communication devices; and storing in a resolver server communicating with the communication network, a second plurality of call-names respectively corresponding to said second plurality of telephone numbers, wherein said resolver server is operative for receiving an individual one of said second plurality of call-names dialed by an individual one of said first plurality of communication devices, and for sending an individual one of said second plurality of telephone numbers corresponding to said individual one of said second plurality of call-names to said software installed on said individual one of said first plurality of communication devices, and wherein the software is operative for receiving, from said resolver server, said individual one of said second plurality of telephone numbers, and establishing a telephone connection from said individual one of said first plurality of communication devices to said individual one of said second plurality of telephone numbers.

\* \* \* \* \*